(12) United States Patent
Oldenburg

(10) Patent No.: US 7,243,531 B2
(45) Date of Patent: Jul. 17, 2007

(54) METHOD AND APPARATUS FOR DYNAMICALLY LOCATING NEUTRAL SHAFT PLANE

(75) Inventor: John E. Oldenburg, Poway, CA (US)

(73) Assignee: Aldila, Inc., Poway, CA (US)

( * ) Notice: Subject to any disclaimer, the term of this patent is extended or adjusted under 35 U.S.C. 154(b) by 78 days.

(21) Appl. No.: 10/858,588

(22) Filed: Jun. 2, 2004

(65) Prior Publication Data
US 2004/0244469 A1    Dec. 9, 2004

Related U.S. Application Data

(60) Provisional application No. 60/476,565, filed on Jun. 6, 2003.

(51) Int. Cl.
*A63B 53/00* (2006.01)

(52) U.S. Cl. .................................... 73/65.03

(58) Field of Classification Search .............. 73/65.03, 73/65.01, 854, 849, 852, 855, 856; 473/345
See application file for complete search history.

(56) References Cited

U.S. PATENT DOCUMENTS

| 4,958,834 | A |   | 9/1990 | Colbert |
|---|---|---|---|---|
| 5,040,279 | A |   | 8/1991 | Braly |
| 5,312,107 | A | * | 5/1994 | Gvoich et al. ............. 473/229 |
| 6,183,275 | B1 |   | 2/2001 | Okura et al. |
| 6,250,168 | B1 |   | 6/2001 | D'Aguanno |
| 6,354,963 | B1 | * | 3/2002 | Kodama et al. ............ 473/345 |
| 6,526,613 | B1 | * | 3/2003 | Penley ...................... 73/65.03 |
| 6,543,125 | B2 |   | 4/2003 | Weiss et al. |
| 6,609,429 | B2 | * | 8/2003 | Weiss et al. .................. 73/854 |

* cited by examiner

*Primary Examiner*—Jewel V. Thompson
(74) *Attorney, Agent, or Firm*—Birch, Stewart, Kolasch & Birch, LLP

(57) ABSTRACT

Apparatus and method for locating the neutral bending plane of an elongated flexible shaft, typically a golf club shaft, by mounting one end portion of the shaft in a clamping mechanism having a rotatable clamp member that permits the shaft to turn about its longitudinal axis while being driven through a motion simulating a golf swing, with sufficient speed to cause the inertial loading of the shaft by its own mass, enhanced by a head weight, to turn the clamp member and the shaft into alignment with the path of movement of the shaft during the simulated swing. A brake fixes the shaft in this position during the swinging motion. A first embodiment uses a rotary motor to rotate the shaft in a radially projecting position about a stationary axis, with a clamping mechanism and brake mechanism on a base plate mounted on the motor shaft. A second embodiment mounts the clamping and brake mechanisms on a robotic golf-strokes machine to move along an arcuate path, and a third embodiment mounts the clamping and brake mechanisms for movement along a linear path, and a fourth mounts the clamping and brake mechanisms in a hand held mechanism to move along the swing path of the intended user.

25 Claims, 5 Drawing Sheets

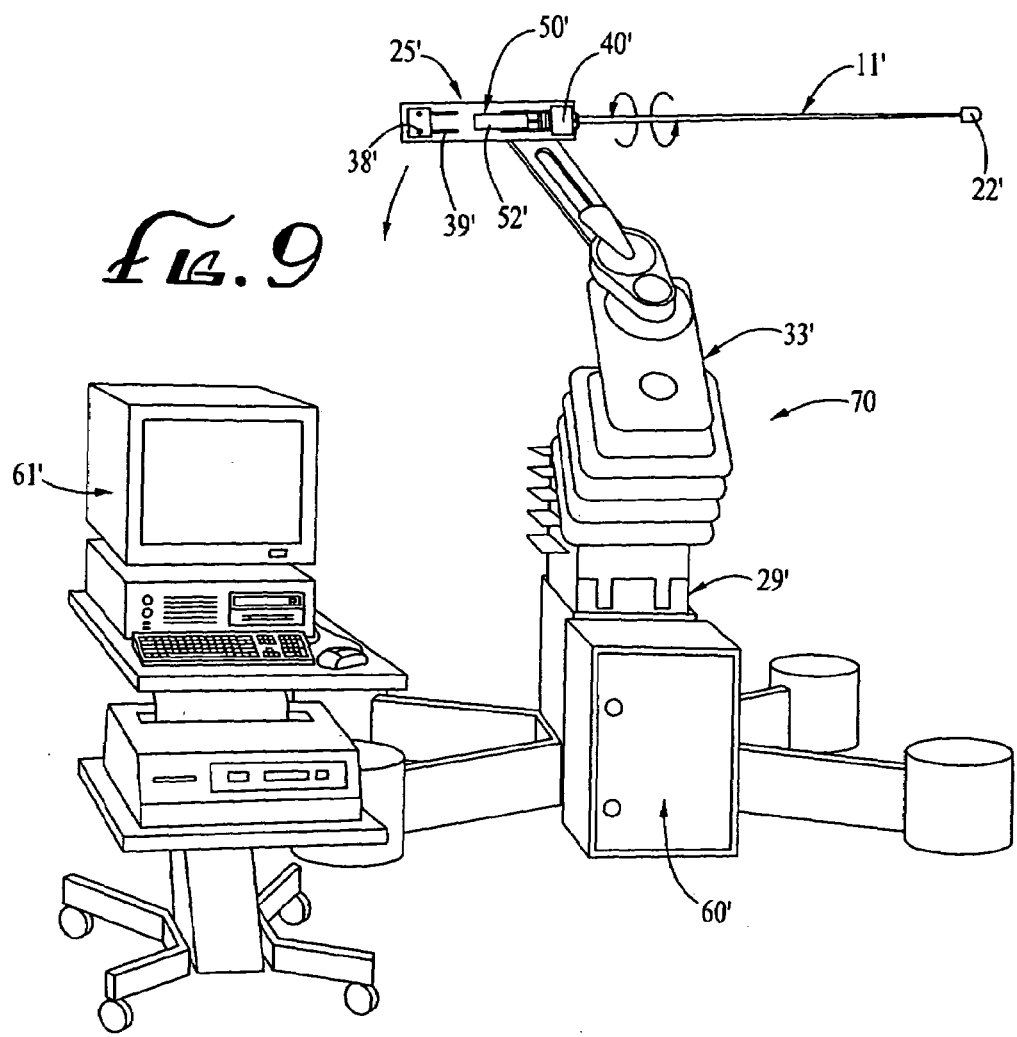
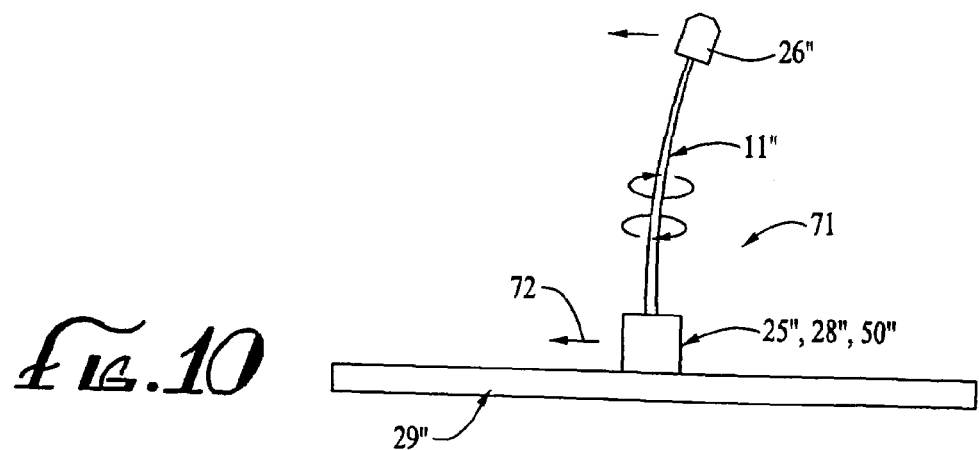

METHOD AND APPARATUS FOR DYNAMICALLY LOCATING NEUTRAL SHAFT PLANE

REFERENCE TO PRIOR PROVISIONAL APPLICATION

This application claims the benefit of prior co-pending provisional application No. 60/476,565, filed Jun. 6, 2003.

BACKGROUND OF THE INVENTION

This invention relates to the design and manufacture of products having elongated flexible shafts, and more generally to the location of the so-called "neutral plane" in an elongated shaft taking into account irregular characteristics in the shaft geometry, including wall thickness, shaft roundness, longitudinal straightness, material variation, and welded seams. This invention has particular reference to golf club shafts, that typically are longitudinally tapered from a larger "butt" end to a smaller "tip" end and are composed of composite material such as carbon, fiberglass or other fibers embedded in epoxy and rolled or wrapped into an elongated tube and subsequently cured, but the invention may be applicable to shafts composed of other materials as well. The illustrative embodiment is described in reference to tubular composite shafts as the primary area of interest, but the invention is not limited to composite shafts and can be used for metal shafts as well.

It is known that composite shafts, whether used for golf clubs, as fishing rods or for other purposes, have irregularities in their structures that produce variations in bending and other properties in the shafts. These irregularities result in variations in swing properties in different planes that extend longitudinally of the shaft. For example, a greater degree of longitudinal stiffness may exist in one plane of bending, making that plane the plane of greatest resistance to bending, or lowest flexibility. In addition to stiffness, other characteristics may be affected as well, including torsional twisting, vibration and other properties that will affect the shaft's performance in service use.

The effects of such variations are matters of concern to manufacturers and assemblers of products that use the shafts. In golf clubs, in particular, in which normal use involves high-speed loading and bending of the shaft followed by impact of a club head on the shaft with a golf ball and subsequent follow through in completion of the golf stroke, balancing of the club with respect to lateral bending, torsional twisting, vibration and stiffness is of critical importance. For these reasons, manufacturers have developed a variety of methods and apparatus for finding what often is referred to as the "spine" or the "seam" of the shaft so each manufacturer can mount its club heads in the angular position on the tip ends of their shafts that they regard as the optimum orientation for their clubs.

Apparatus and methods that have been developed for these purposes include those disclosed in U.S. Pat. No. 4,958,834, which also contains a lengthy background section referring to other early patents in this field. The '834 patent discloses in FIG. 7 a locator fixture in which the butt end of a shaft is held in a set of bearings while the shaft is manually deflected and rotated to detect the seam or spine by feel. This patent then recommends locating the seam at the rear or trailing side of the shaft for maximum driving distance, or alternatively at the front of the shaft.

More recent apparatus and methods are shown and described in U.S. Pat. Nos. 6,183,275, 6,543,125 and 6,250, 168. In U.S. Pat. No. 6,183,275, relatively complex mechanisms are provided for claimed precision in locating the seam in either a composite shaft or butt-welded metal shaft. In one method (in FIG. 3), the user places the end of the shaft in rotatable bearing rings, attaches a weight near the midpoint and then rotates the shaft while observing gauge readings indicating the highest deflection. This patent recommends placing the club head so that the seam is on the front side of the shaft. In U.S. Pat. No. 6,543,125, a preferred orientation, or "preferred oscillation plane," is determined by measuring the oscillation of a shaft when a horizontal impulse is applied, and then analyzing the oscillation or vibration to select the preferred plane. In U.S. Pat. No. 6,250,168, a mechanism is proposed for simply applying a load to the tip end of a shaft while the butt is held stationary but freely rotatable about the longitudinal axis of the shaft. In a somewhat similar approach, U.S. Pat. No. 5,040,279 discloses a method and apparatus that finds a vertically oscillating plane using a cantilever beam frequency set up.

All of the foregoing apparatus and methods, and others of a similar nature, attempt to locate the most favorable attitude or orientation of the golf club shaft through a variety of different approaches, all of which are effective to some degree but are limited by the methodology they employ and the inability of that methodology to analyze the shaft under all of the conditions that actually are encountered during use of the golf club.

The general objective of this invention is to provide a method and apparatus that can be used quickly and effectively to locate the neutral plane of each shaft that will enable the golf club manufacturer to optimize the performance of the assembled club by reducing the negative effects that are imparted to the club head during the golf stroke. For purposes of this disclosure, this plane sometimes will be referred to as the "neutral plane" rather than the spine or seam of the shaft, and the process may be referred to as "neutralizing" the shaft.

SUMMARY OF THE INVENTION

The present invention resides in a novel method and apparatus for dynamically locating the neutral plane of a shaft through inertial loading, by mounting one end of a shaft, preferably the butt end of a golf club shaft, in a fixture that permits the shaft to rotate about its longitudinal axis; preferably loading the other end of the shaft with a head weight simulating a golf club head; and driving the fixture to swing the shaft through a simulated golf stroke with sufficient speed to bend the shaft. This causes the shaft to find its own neutral plane by assuming a bent position and angular orientation induced by the inertial loading of the shaft during the simulated golf swing, in alignment with the path or plane of motion of the shaft. The shaft is fixed in the fixture at a selected point during the swinging motion so that the position of the neutral plane is preserved and can be marked for identification in subsequent manufacturing and assembly operations.

In a first embodiment of the invention, the fixture is mounted for rotation about a preselected axis that extends transversely of the longitudinal axis of the shaft at the butt end portion, thus swinging the loaded tip end portion along a generally circular path, and a clamping mechanism in the fixture permits angular rotation of the shaft during the simulated stroke and orientation of the shaft while it is in the loaded and rotating condition, and then clamps the shaft in the fixture. A second embodiment holds the butt portion end of the shaft rotatably in a similar fixture that is mounted on a robotic golf stroke apparatus, so that the fixture follows an arcuate path similar to a golfer's grip path while also rotating during the simulated stroke. A third embodiment mounts the butt end portion of a shaft in a similar fixture supported for linear movement and similarly loads the tip end to be deflected when the butt end is driven along the path at speeds that simulate the speed of the golf club stroke. Again, this generally simulates the motion of the club shaft during the swing and the inertial effect of the head of the club. And again, the fixture in each embodiment has a clamping mechanism for permitting angular rotation of the shaft during loading and for fixing the angular orientation of the shaft while it is in the loaded condition, as before.

The apparatus of the invention includes, in addition to drive motors, suitable controls for the motors for initiating stroke-simulating motion, providing selected rates of acceleration and deceleration during the stroke and a maximum rate of rotation at the peak rate, and actuating the clamping mechanism or brake for fixing the angular position of the shaft at the selected moment during the stoke. In addition, the invention contemplates appropriate safety measures, including a protective enclosure or cage for the apparatus.

Other aspects and advantages of the invention will become apparent from the accompanying drawings and the following detailed description.

BRIEF DESCRIPTION OF THE DRAWINGS

FIG. 9 is a front perspective view of a second embodiment of the invention in which the invention is incorporated in a robotic golf stroke apparatus; and FIG. 10 is a diagrammatic side elevational view of a third embodiment of the invention in which a fixture including a clamping mechanism is supported for linear movement along a preselected path with one end portion of a shaft held rotatably in the clamping mechanism to be fixed at a selected point along the path;

DETAILED DESCRIPTION

Figure 8:
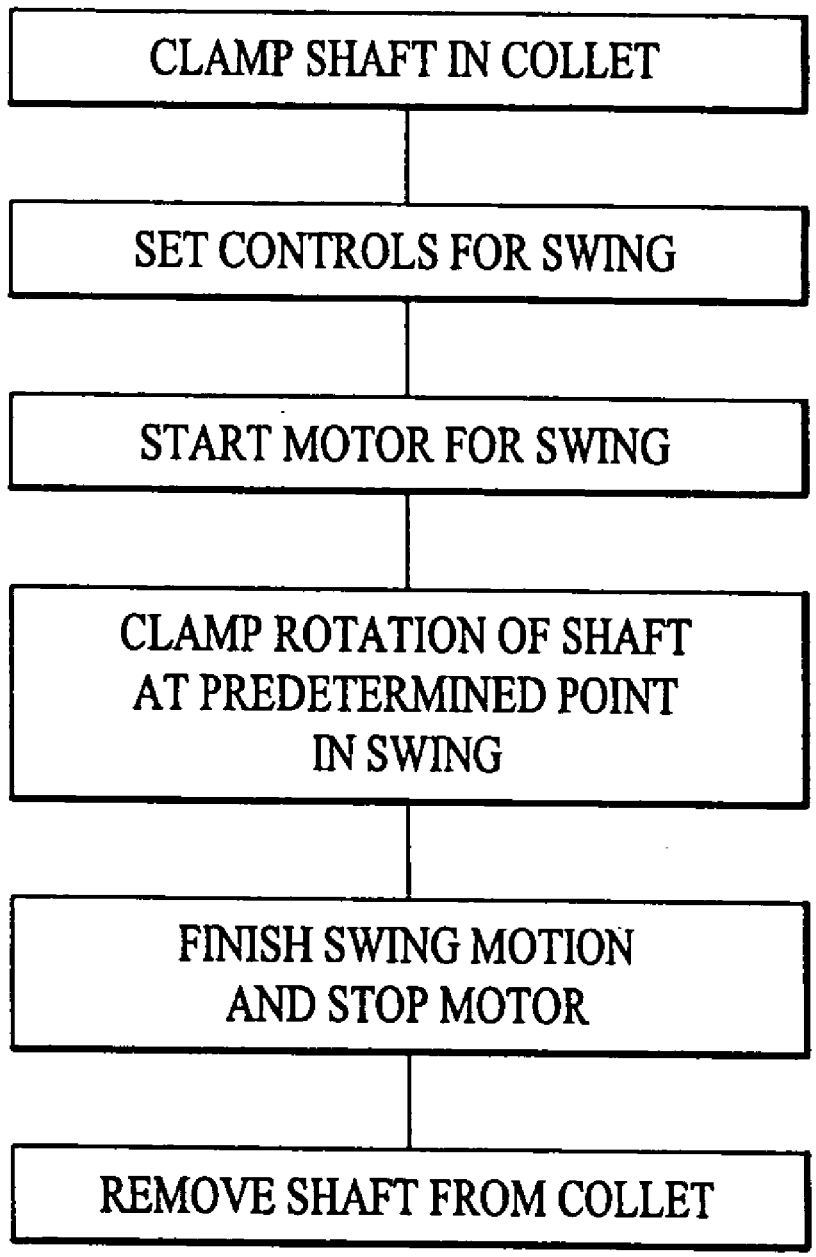
FIG. 8 is a block diagram illustrating a representative sequence of operations of the apparatus of the invention.

As shown in the drawings for purposes of illustration, the invention is embodied in three different embodiments of apparatus for practicing the method of the invention. The first embodiment is shown in FIGS. 4 through 7 of the drawings and the sequence of its operation is shown in FIG. 8, and the second and third embodiments are shown in FIGS. 9 and 10, wherein corresponding primed and double-primed reference numbers are used to indicate parts that may be identical or substantially similar. Before describing these embodiments, a brief explanation of the relevant fundamentals of golf club shaft construction will be provided as further background for the invention.

As has been stated, it is inherent in the manufacture of shafts such as composite golf club shafts that most, if not all, shafts are not perfectly balanced about the central longitudinal axis of the shaft. Causes of this imbalance include, but are not limited to, design, variations in materials such as modulus, density, fiber alignment, shaft straightness and finishing practices, all of which can contribute to irregularities or imperfections in the shaft, creating a shaft that is not symmetric with respect to the central longitudinal axis of the shaft. As a result, golf club behavior is not entirely controllable by the user, and a shaft will perform in different ways depending upon how the club head is assembled on the shaft with respect to the irregularities. Variations in the "loft," "lie" and "squareness" of the club face at impact can occur with different angular orientation of a club head on a shaft.

Figure 1:
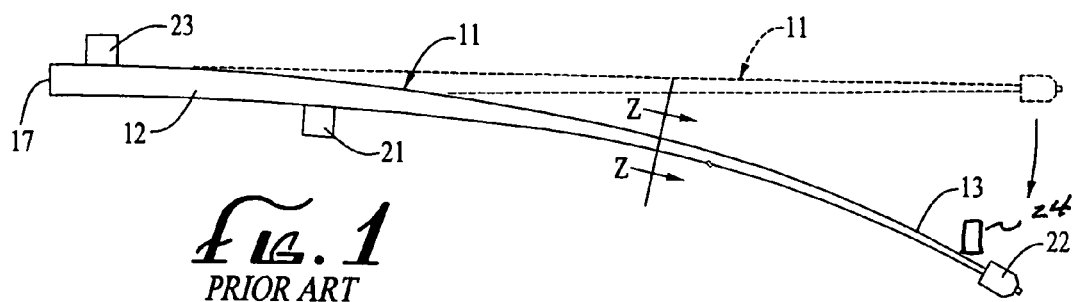
FIG. 1 is a schematic view illustrating a prior conventional method and apparatus for finding the neutral plane of a golf club shaft.
Figure 2:
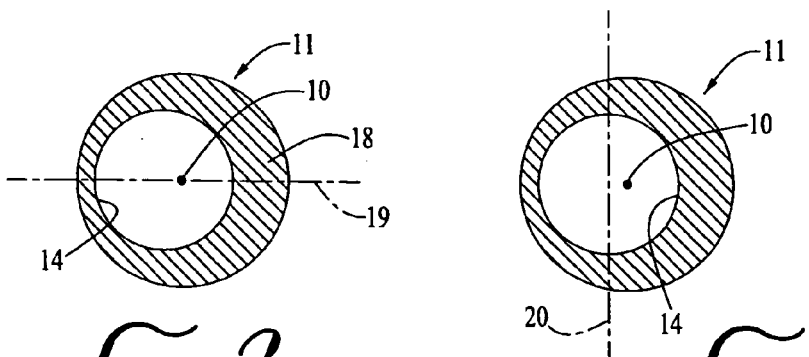
FIG. 2 is an enlarged transverse cross-sectional view through a representative golf club shaft, such as the section along line 2—2 of FIG. 1, illustrating in an exaggerated manner an off-center mass distribution which can result from uneven characteristics of the materials of the shaft or from uneven application of the materials in producing the shaft.

Illustrated in FIG. 2 in an exaggerated manner is an "off-center" mass distribution about the central longitudinal axis 10 of a representative golf club shaft 11, shown in full in FIG. 1. The shaft, which ideally would be perfectly straight, has a butt end portion 12, a tip end portion 13 and a hollow interior 14, and tapers from a maximum outside diameter at the butt end 17 to a smaller diameter at the tip end, where a club head (not shown) eventually will be mounted. A grip typically is mounted in the butt end portion of the shaft in the finished club, all in a well known and conventional manner. It is to be understood that the shaft 11 shown in the drawings is illustrative only.

Figure 3:
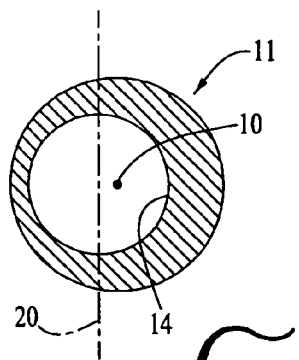
FIG. 3 is a view similar to FIG. 2 illustrating the weakest plane of the representative shaft.

It will be seen in FIG. 2 that the central longitudinal axis 10 and the center of curvature of the outside diameter of the illustrative shaft is not the actual center of the mass of the shaft in the area where this section is taken. Instead, this actual center of mass is offset toward the thicker wall section on the right hand side, as indicated at 18. The horizontal plane indicated by the line 19 through the shaft can be considered to be the central plane with respect to mass, but not necessarily the neutral plane with respect to stiffness or resistance to bending. This plane is illustrated in FIG. 3 by the vertical line 20 that actually is offset to the left from the longitudinal axis 10.

Shown in FIG. 1 is a fixture or apparatus of a type that has been used for locating the so-called "spine" or "seam" of shafts, comprising stationary fulcrums 21, 23, and 24 on which a shaft is placed, a weight 22 applied to the tip portion of the shaft. The butt end portion 12 of the shaft is held by fulcrums 21 and 23, cantilever fashion, on the fulcrum while permitting the shaft to rotate. Loaded in this manner, the shaft will rotate until the neutral plane of the shaft is in a vertical plane.

In accordance with the present invention, the neutral plane of a shaft is determined through dynamic inertial loading by mounting one end of the shaft 11, preferably the butt end portion 12, in a fixture 25 that permits the shaft to rotate about its longitudinal axis 10, and then driving the fixture to swing the shaft through a stroke-simulating motion, causing the shaft to bend and to find its own neutral plane which can be fixed or marked at a selected point during the simulated stroke. Preferably, the inertial loading is enhanced by affixing to the free end of the shaft a weight 26 that simulates the weight of a golf club head for more realistic simulation of the golf club stroke.

Figure 4:
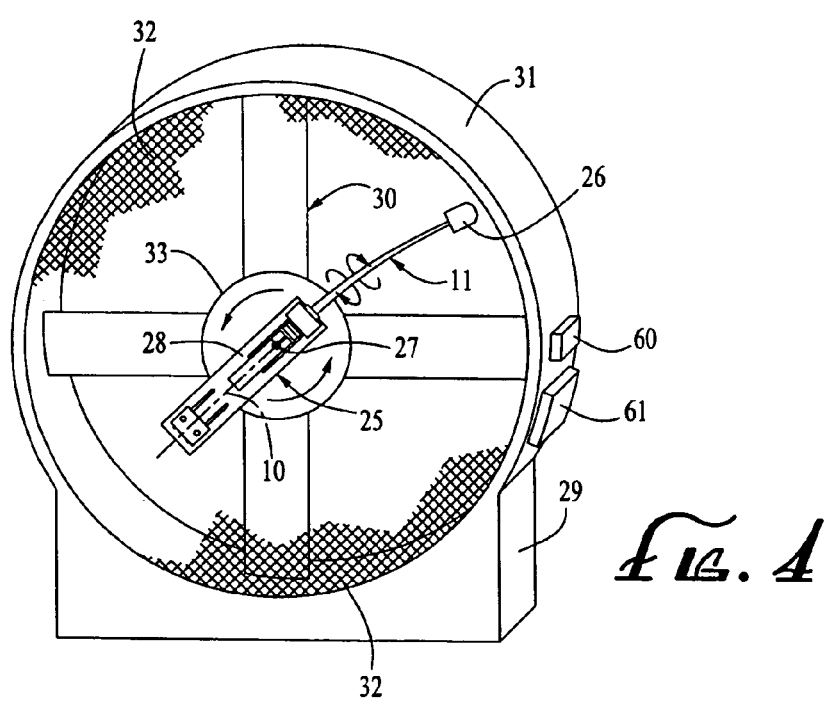
FIG. 4 is a fragmentary front side perspective diagrammatic view of a first apparatus embodying the novel features of the present invention and for use in practicing the method of the invention, shown with a representative golf club shaft held in the apparatus and being rotated to locate the neutral plane of the shaft in accordance with the invention.

As shown in FIG. 4, the first embodiment of the invention mounts the fixture 25 for rotation about a fixed axis 27 that extends transversely of the axis 10 of the shaft near the end of the shaft. The fixture includes a clamping mechanism 28 that holds the butt end portion of the shaft against axial movement while permitting angular rotation of the shaft about its own longitudinal axis during the simulated stroke, and fixes the shaft at a selected point during the latter portion of the stroke after the inertial positioning of the shaft in the fixture. More specifically, the fixture 25 is mounted on a base 29 supporting a frame 30 that may be of any desired shape but herein is shown as having a generally cylindrical exterior 31 with a radius sufficiently large to permit a shaft to be mounted with one end in the fixture and the free end inside the cylindrical wall of the frame. This frame may be enclosed with a protective covering such as expanded metal screening 32 and provided with one or more access doors (not shown) for loading and unloading of shafts and for maintenance purposes.

The power actuator for rotating the fixture 25 is a rotary motor 33, for example, an AC electric motor, that is mounted on the frame 30 and has a horizontal output shaft 34 (FIG. 5) carrying a concentric flywheel 35. The fixture 25 has an elongated base or mounting plate 37 that is secured to the flywheel for rotation on the motor shaft and the flywheel while holding a shaft 11 in a generally radial position extending outwardly from the shaft axis. Thus, the axis of the motor shaft is the axis 27 of rotation of the fixture. For counterbalancing the load on the motor, the base plate 37 projects outwardly on the side of the motor shaft opposite the shaft 11 and carries a counterweight 38 which is radially adjustable along parallel mounting slots 39 in the base plate.

Mounted on the base plate 37 on the end portion thereof opposite the counterweight 38 is the clamping mechanism 28 for holding the shaft 11. As shown most clearly in FIGS. 5 and 6, this mechanism comprises a clamp block 40 secured to one side of the base plate and having a central bore 41 (FIG. 6) in which a clamping collet 42 is mounted in a collet sleeve 43 that is rotatably supported in anti-friction ball-bearing rings 44 in the block 40. The sleeve 43 is held in the block against axial displacement but is freely rotatable in the bearings 44, and a collet nut 45 is threaded onto the right-hand (radially inner) end portion of the collet to be tightened against the end of the sleeve 43. Such tightening draws the collet 42 into the sleeve and pulls the enlarged cam-shaped outer end 48 of the collect into the flared outer end 49 of the collet sleeve 43 to contract the collet 42 as it is drawn into the sleeve.

With this arrangement, the butt end portion 12 of a shaft 11 can be inserted into the clamping collet 42 while the nut 45 is loose and the collet bore is "open"—the collet is sized to receive the full range of butt sizes that are to be handled. The collet then is tightened on the shaft by tightening the nut 45 to draw the collet into the sleeve 43, until a selected approximate amount of clamping force is applied to hold the shaft securely in place. The head weight 26 is attached to the outer or tip end of the shaft 11 before the shaft is rotated, preferably before the shaft is loaded into the clamping mechanism 28. While the head weight may take various forms, one convenient and effective weight is a keyless drill chuck of the type often used on a three-eighths inch electric portable drill. Such a chuck may be fitted over any of the tip ends having the range of tip sizes to be handled and then tightened to grip the shaft securely in the chuck. No specific amount of weight is required, but it is preferred that the weight is in the same approximate range as standard weight of the head of a golf club, about two hundred grams for a driver. The illustrative drill chuck weighs about his amount.

To fix the angular position of the shaft 11 in the fixture 25 as the shaft is being swung through the stroke-simulating motion, the clamping mechanism 28 of the fixture includes a brake mechanism 50 for selective clamping engagement with the shaft and operable when engaged to hold the shaft against further turning in the fixture 25. Herein the brake mechanism is mounted on the base plate 37 beside the inner end 17 of the shaft 11 and comprises a brake shoe 51 engageable with the butt end 17 of the shaft and a brake actuator 52 for applying the brake. The preferred actuator is a pneumatic piston mounted on the base plate 37 with a piston rod 53 carrying the brake shoe and extendable to push the shoe to the right (FIG. 6) and against the shaft. The brake mechanism also could act on the clamping mechanism to lock the shaft in place.

For actuation of the pneumatic piston 52 during rotation of the fixture 25 that carries the piston, appropriate air lines 54 (FIG. 7) extend from a source (not shown) of air under pressure to a rotary air joint 55 that communicates between the non-rotating source lines 54 and rotating connecting lines 57 to the cylinder 50. These lines reciprocate the piston rod 53 and the brake shoe 54, upon command, which may be either manual or automatic, in a manner that is well known.

It is to be noted that fixing the shaft position after the neutral plane has been located is important in order to preserve the location for future use in assembling the golf club. In this regard, the same function can be performed by simply marking the shaft during rotation rather than clamping it in place, although marking is more conveniently done after the stroke has been stopped. It should be understood that such marking is one way to accomplish fixing of the shaft's angular position.

With the foregoing apparatus, shafts 11 can be tested and marked quickly and easily by inserting one end of a shaft in the open collet 42, tightening the collet nut 45 to close the collet and clamp the shaft in the fixture 25, and applying the head weight 26 either before or after loading the shaft. After closing the protective enclosure 31 around the fixture and the shaft, the motor 33 is started and accelerated to a preselected rate of rotation, developing a shaft speed that is sufficient to simulate a golfer's stroke. With the clamping mechanism disengaged, this permits the inertial loading of the shaft to deflect the tip end portion of the shaft and cause the shaft to bend and rotate in the clamping mechanism into its neutral plane, as determined under stroke-simulating conditions. This plane will be generally aligned with the path of the shaft. Then the angular position of the shaft is fixed, herein by engaging the brake 50, and the apparatus is decelerated to a stop for removal of the shaft and marking of the location of its neutral plane.

This cycle can be controlled manually, but preferably is automated with a motor drive control 60 for controlling rates of acceleration and deceleration and the maximum r.p.m. achieved, and a computer control 61 that may be programmed for the length of the shaft to be tested and the head weight, as well for the engagement and disengagement of the brake 50. Details of construction and operation of these controls are within the skill of those familiar with motor and computerized controls and pneumatic actuators.

Shown in FIG. 9 is the second embodiment of the invention, in which a fixture 25' including a clamping mechanism 28' has been incorporated in a conventional robotic golf stroke machine 70 that is capable of swinging a golf club 11' through an even more realistic stroke-simulating motion. For this purpose, the conventional grip mechanism of the robotic machine is replaced by the fixture 25' similar to the fixture 25 of the first embodiment, and the clamping mechanism 28' permits angular rotation of the shaft and a brake mechanism 50' fixes the angular position at the selected point in the golf stroke. A motor 33' is provided to drive this mechanism through its stroke, and a motor control 60', with a computer 61', is provided to drive the motor with the desired rates of acceleration and deceleration, and also to engage and disengage the brake mechanism.

This embodiment produces a specifically different path of rotation of the shaft, including the motion of the fixture 25' from the raised position shown in FIG. 9 through an arc finishing in the usual follow-through of the golf stroke. While the shaft 11 is swung through this arc with selected speed, the brake mechanism is engaged at the selected moment to fix the angular position of the shaft and thereby locate the neutral plane. This may be done at different moments, but preferably is done when the machine is advancing the shaft at the maximum rate for the stroke.

The third embodiment, shown diagrammatically in FIG. 10, is an apparatus 71 that is designed to support a fixture 25" including a clamping mechanism 28" for motion along a preselected linear path on a base 29", as indicated by the arrow 72, so that the inertial loading of the shaft 11", enhanced by the head weight 26", bends and deflects the shaft as shown while causing the shaft to rotate about its longitudinal axis to locate its neutral plane. The clamping mechanism 28" is operable as in the first embodiment to clamp the shaft in the angular position that it assumes under inertial loading, thereby locating and fixing the neutral plane.

Figure 5:
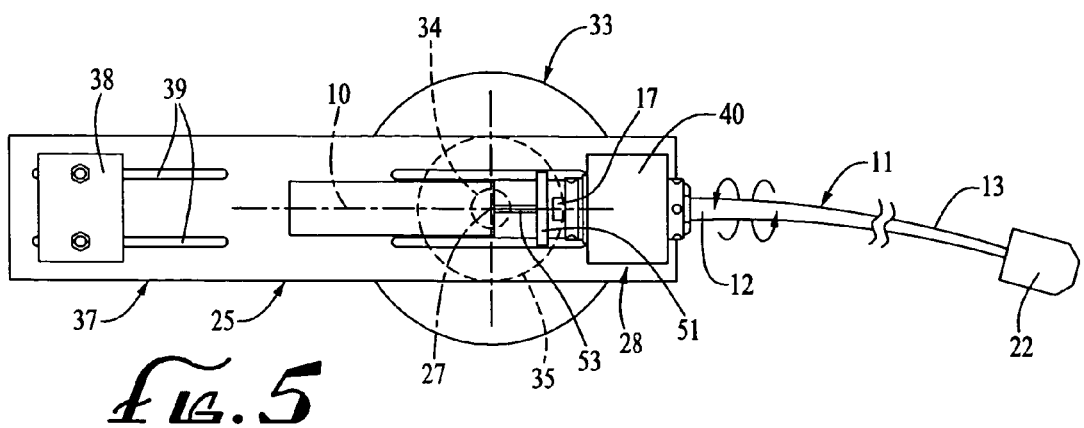
FIG. 5 is an enlarged fragmentary side elevational view of the clamping mechanism and shaft for use in the apparatus of FIG. 4.
Figure 6:
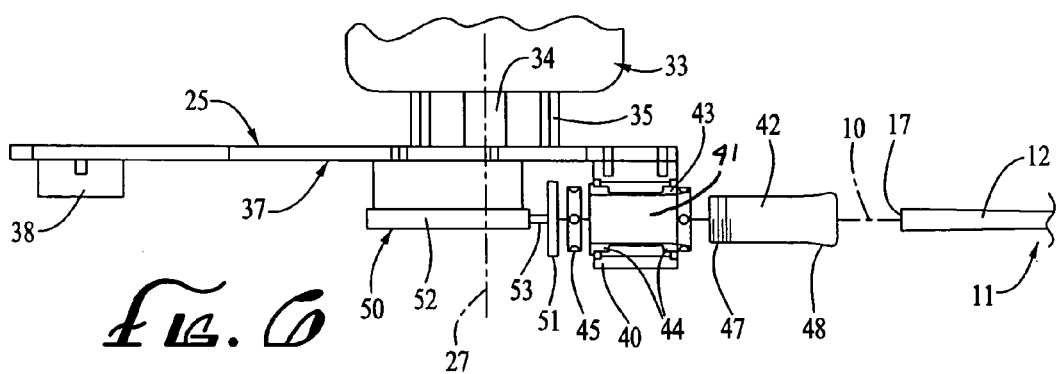
FIG. 6 is a fragmentary top plan view of parts shown in FIG. 5, with parts in moved or exploded positions.
Figure 7:
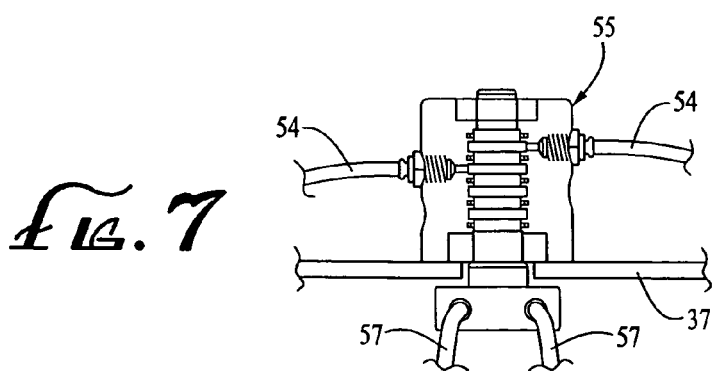
FIG. 7 is an enlarged fragmentary cross-sectional view showing a rotary air joint of the apparatus for providing actuating air under pressure to the clamping mechanism.
Figure 11:
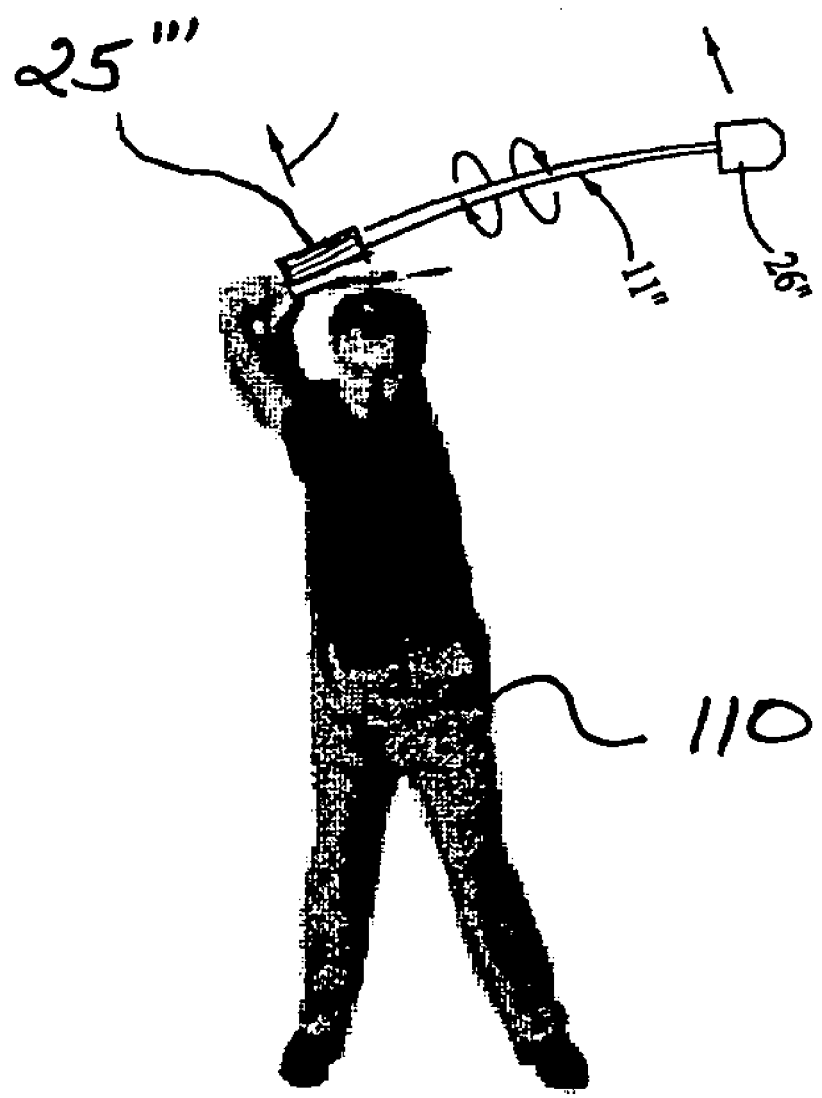
FIG. 11 is a diagrammatic front view of a fourth embodiment of the invention.

The fourth embodiment, shown diagrammatically in FIG. 11, is an apparatus 25''' similar to that described in FIG. 5 and FIG. 6, but sufficiently light to be swung by a human golfer. This embodiment will allow the shaft to move along the swing path, velocity and acceleration imparted by a user 110.

From the foregoing, it will be seen that the present invention provides a novel and effective apparatus and method for locating the neutral plane of the shaft under dynamic loading that more closely and effectively simulates realistic golf stroke conditions to which the shaft will be subjected in use, thereby enabling manufacturers and assemblers of products using the shafts to position parts on the shaft more effectively for optimum performance. It also will be evident that, while these embodiments of the apparatus have been illustrated and described, various modifications and changes may be made by those skilled in the art within the scope of the invention.

I claim:

1. The method of dynamically locating the neutral plane of an elongated, flexible golf club shaft having butt and tip end portions, comprising the steps of:

mounting the butt end portion of the shaft in a fixture and holding the shaft in the fixture for free rotation about the longitudinal axis of the shaft;

fixing a weight to the tip end portion of the shaft;

moving the fixture to cause the shaft to move along a predetermined path transversely of the longitudinal axis of the shaft with sufficient speed to simulate a golf stroke and cause the shaft to bend under the inertial load on the shaft, thereby causing the shaft to rotate in the fixture into an angular position in which the neutral plane of the shaft is aligned with said path;

and fixing the shaft in that angular position during the movement along said path.

2. The method defined in claim 1 wherein the moving step is performed by rotating the fixture about an axis extending transversely of the longitudinal axis of the shaft adjacent to the butt end portion.

3. The method defined in claim 1 wherein the moving step is performed by swinging said fixture along an arcuate path while rotating the shaft about an axis extending transversely of the shaft axis adjacent to the butt end portion.

4. The method defined in claim 1 wherein the moving step is performed by moving said fixture along a linear path.

5. The method defined in claim 1 wherein the fixing step is performed by engaging a brake with the butt end portion of the shaft.

6. The method of locating the neutral plane of an elongated flexible shaft comprising the steps of:

gripping one end portion of the shaft in a manner that permits free angular rotation of the shaft about its longitudinal axis;

and moving said one end portion to move the shaft along a predetermined path extending transversely of the shaft with sufficient speed to simulate the movement of a golf stroke and cause the shaft to bend under the inertial load on the shaft, thereby causing the shaft to rotate into an angular position in which the neutral plane is generally aligned with said path, thereby locating said neutral plane.

7. The method defined in claim 6 including the additional step of fixing a weight to the other end portion of said shaft before the moving step thereby to enhance the inertial loading of the shaft.

8. The method defined in claim 6 including the further step of fixing the shaft in said angular position while under the inertial loading.

9. The method defined in claim 6 wherein said moving step is performed by rotating said one end portion about an axis extending transversely of the longitudinal axis of the shaft adjacent to said one end portion.

10. The method defined in claim 6 wherein the moving step is performed by swinging said one end portion along an arcuate path while rotating the shaft about an axis extending transversely of the shaft axis adjacent to said one end portion.

11. The method defined in claim 6 wherein the moving step is performed by moving said one end portion along a linear path.

12. Apparatus for dynamically locating the neutral plane of an elongated flexible shaft having a butt end portion and a tip end portion, comprising:

a base;

a base plate mounted on said base for rotation about a predetermined axis of rotation said base plate projecting generally radially from said axis of rotation;

a clamping mechanism carried by said base plate and including a clamp block on said base plate, a clamp member mounted in said block and having a bore having a central axis that extends radially relative to said axis of rotation to receive the butt end portion of a shaft with the longitudinal axis of the shaft extending along said central axis, said clamp member being selectively engageable and disengageable with a shaft in said bore to hold the shaft in said clamping mechanism with the tip end portion projecting radially outwardly from the clamping mechanism, and anti-friction bearings mounting said clamp member on said block for free rotation about said central axis;

a motor for rotating said base plate about said axis of rotation and swinging said shaft about said axis of rotation at a sufficient speed to cause the shaft to bend under the inertial load on the shaft, thereby causing said clamp member and the shaft to rotate in the clamp block into an angular position about said central axis in which the neutral plane of the shaft is aligned with the plane of rotation of the shaft;

and a brake mechanism that is selectively operable during rotation of said base plate and of the shaft in the clamping mechanism to fix the angular position of the shaft while the neutral plane of the shaft is aligned with the plane of rotation.

13. Apparatus as defined in claim 12 further including a head weight that is mountable on the tip end portion of a shaft to enhance the inertial loading of the shaft during rotation.

14. Apparatus as defined in claim 13 wherein said head weight has a weight approximately equal to the weight of a golf club head.

15. Apparatus as defined in claim 12 wherein said motor has an output shaft defining, an axis of rotation, and said base plate is carried on said output shaft with opposite ends of the base plate projecting in opposite directions from the axis of rotation, said clamping mechanism being supported on one side of the axis of rotation, and further including a counterweight adjustably supported on said plate on the other side of the axis of rotation.

16. Apparatus as defined in claim 12 wherein said clamp member is a collet having an enlarged cam-shaped end and mounted in a collet sleeve having a collet bore with a flared radially outer end that is engageable with the collet to contract the collet around a shaft as the collet is drawn into the collet bore, and further including a collet nut threaded onto the inner end of said collet and bearing against said collect sleeve to draw the collet into the collet bore, said collet sleeve being rotatably mounted in said block by said anti-friction bearings.

17. Apparatus as defined in claim 12 wherein said brake mechanism comprises a brake shoe positioned on the radially inner side of said clamping mechanism and supported for selective movement toward and away from the position of the butt end portion of a shaft held in the clamping mechanism.

18. Apparatus as defined in claim 17 wherein said brake shoe is supported on the piston rod of a pneumatic piston-and-cylinder actuator for engaging and disengaging said brake mechanism, said actuator being mounted on said base plate for rotation with the clamping mechanism and being connected to air supply lines on said base through a rotary air valve.

19. Apparatus as defined in claim 12 wherein said base is surrounded by a protective enclosure, and having controls for said motor and said brake mechanism accessible from outside said enclosure.

20. Apparatus for dynamically locating the neutral bending plane of an elongated flexible shaft, comprising:

a base;

a fixture having a clamping mechanism for gripping and holding one end portion of the shaft with the opposite end portion projecting away from the fixture, said clamping mechanism including a clamp member that is freely rotatable on the fixture about the longitudinal axis of the shaft to permit the shaft to turn about its axis relative to the fixture;

and said fixture being supported on said base for movement relative to the base in a preselected manner to move the shaft along a predetermined path extending transversely of the shaft;

and a power actuator for driving said fixture to move the shaft with sufficient force to simulate the movement of a shaft during a golf stroke and cause the shaft to bend under the inertial load on the shaft, thereby causing the shaft to rotate the clamp member in the fixture into an angular position in which the neutral plane of the shaft is aligned with said path, thereby locating said plane.

21. Apparatus as defined in claim 20 wherein said power actuator is a rotary electric motor having an output shaft, and said fixture is driven by the output shaft to rotate about a fixed axis of rotation with the shaft extending radially outwardly relative to said axis of rotation.

22. Apparatus as defined in claim 20 wherein said power actuator comprises a robotic golf-stroke machine, said fixture being mounted on said machine to follow an arcuate path while rotating to move said shaft along said predetermined path.

23. Apparatus as defined in claim 20 wherein said base supports said fixture for movement along a linear path.

24. Apparatus as defined in claim 20 wherein said clamping mechanism comprises a clamping member for gripping the shaft and holding the shaft in the fixture, anti-friction bearings rotatably mounting said clamp member on the fixture, and a selectively engageable and disengageable brake mechanism carried by said fixture and operable when engaged to hold the clamp member in a fixed angular position.

25. Apparatus as defined in claim 24 wherein said brake mechanism is engageable with the shaft to fix the angular position.

* * * * *